(12) United States Patent
Eberle et al.

(10) Patent No.: US 8,061,511 B2
(45) Date of Patent: Nov. 22, 2011

(54) CONVEYOR BELT GUIDE

(75) Inventors: Marc Eberle, Balgonie (CA); Bradley Zazula, Regina (CA)

(73) Assignee: Brandt Industries Ltd., Regina, Saskatchewan (CA)

( * ) Notice: Subject to any disclaimer, the term of this patent is extended or adjusted under 35 U.S.C. 154(b) by 243 days.

(21) Appl. No.: 12/357,049

(22) Filed: Jan. 21, 2009

(65) Prior Publication Data

US 2009/0218198 A1 Sep. 3, 2009

Related U.S. Application Data

(63) Continuation of application No. 11/059,745, filed on Feb. 17, 2005, now abandoned.

(30) Foreign Application Priority Data

Dec. 21, 2004 (CA) .................................... 2490586

(51) Int. Cl.
*B65G 21/20* (2006.01)
(52) U.S. Cl. ..................................... 198/837
(58) Field of Classification Search .................. 198/837, 198/838, 860.3, 860.5, 861.1, 808
See application file for complete search history.

(56) References Cited

U.S. PATENT DOCUMENTS

| 779,666 | A | | 1/1905 | Robins, Jr. | |
|---|---|---|---|---|---|
| 2,655,251 | A | | 10/1953 | Bankauf | |
| 3,155,227 | A | * | 11/1964 | Wesson | 198/834 |
| 4,371,580 | A | * | 2/1983 | Morrison et al. | 442/246 |
| 4,905,843 | A | * | 3/1990 | Holbert | 209/571 |
| 4,917,232 | A | | 4/1990 | Densmore | |
| 5,947,266 | A | * | 9/1999 | Rionde | 198/860.3 |
| 6,170,644 | B1 | * | 1/2001 | Nakaegawa et al. | 198/811 |
| 6,390,289 | B1 | | 5/2002 | Hoggan | |
| 6,478,143 | B1 | * | 11/2002 | Enomoto | 198/838 |
| 6,491,156 | B1 | * | 12/2002 | Hudson | 198/811 |
| 6,651,804 | B2 | * | 11/2003 | Thomas et al. | 198/594 |
| 6,837,366 | B2 | * | 1/2005 | Nishikita | 198/847 |

* cited by examiner

*Primary Examiner* — Ramya Prakasam
(74) *Attorney, Agent, or Firm* — Frost Brown Todd LLC

(57) ABSTRACT

A belt guide apparatus for attachment to a belt conveyor comprises top and bottom plates. Walls extend between the top and bottom plates. The plates and walls form a belt envelope that defines a belt opening that substantially corresponds to a cross-section of the endless belt such that the endless belt can slide freely through the belt opening yet is substantially prevented from moving laterally or vertically. A front entrance of the belt envelope is configured to funnel the endless belt into the belt opening, and when attached to the belt conveyor the belt envelope is oriented such that the right and left walls are aligned with a desired path of the endless belt, and the endless belt passes through the belt opening.

18 Claims, 2 Drawing Sheets

CONVEYOR BELT GUIDE

This invention is in the field of belt conveyors and in particular mechanisms for properly tracking the conveyor belt with respect to the conveyor rollers.

BACKGROUND

Belt conveyors are used in a wide range of applications for transporting both individual packages and bulk material such as grain, ore, gravel, and the like. Such belt conveyors typically comprise a top conveying run on which the load is placed, and a bottom return run. The ends of the belt are connected together by a belt lace or like device to form an endless belt mounted on end rollers at each end of the belt conveyor.

Typically package belt conveyors have a flat top conveying run supported on a plate or rollers, while bulk belt conveyors have outer edges of the belt on the top conveying run raised to form a trough to retain the bulk material on the belt. The top conveying run may be supported in the troughed configuration by rollers or plates, and in many applications the conveying run passes through a tube that supports it in the troughed configuration. At the ends of the conveyor with either a troughed or flat conveying run, the belt is flat as it passes over the end rollers, and typically the return run is flat and is supported by idler rollers, plate sections or the like spaced at suitable intervals under the conveyor.

The mechanisms used to drive the belt will vary depending on the conveyor length, load, configuration, and like conditions. In a simple configuration, a motor can be used to drive one of the end rollers of the conveyor. Friction between the belt and drive roller causes the belt to move with the surface of the roller. Where increased force is required to drive the belt because of long length, high load, or the like, the return run typically passes through an S-drive mounted under the conveyor. In the S-drive, idler rollers cause the belt to wrap farther around the drive roller, increasing the frictional force between the belt and drive roller and allowing more power to be transferred from the drive roller to the belt.

A problem with belt conveyors is that the belt must be tracked properly, meaning it must be maintained in alignment with the end rollers, idler rollers, and S-drive rollers. Such belts tend to move laterally along the surface of the rollers toward one roller edge or the other where the belt edge will rub against support brackets and the like and be damaged. Typically adjustments are provided to track the belt by moving the ends of the rollers forward or rearward. In an initial adjustment the end rollers and S-drive rollers are squared with the proper belt path, such that the belt should track properly. During use however, conveyor belts have a tendency to wander laterally and frequent tracking adjustment is required in prior art belt conveyors. Such adjustment is conventionally accomplished by moving one end of an end roller, or one end of a drive roller, to tighten or loosen the belt.

This tracking problem has been well recognized in the prior art. U.S. Pat. No. 779,666 to Robins Jr. for example provides guide rollers oriented perpendicular to the edges of the belt on the conveying run and return run of a belt conveyor. When the belt moves laterally the belt edges contact the guide rollers and inhibit the lateral movement. The belt edges however tend to curl upward and climb the guide rollers, allowing the belt to move out of alignment and causing damage to the belt.

U.S. Pat. No. 4,917,232 to Densmore discloses flanged guide rollers oriented to rotate about axes perpendicular to the belt edges and spaced along the conveying and return runs of a conveyor belt following a curved path. Lateral movement of the belt is inhibited when the edges of the belt contact and rotate the rollers. The flanges extend over the edges of the belt to prevent the edges of the belt from curling up and climbing the guide rollers.

U.S. Pat. No. 6,390,289 to Hoggan discloses, contrary to the guide rollers of Densmore, flanged guide rollers spaced along the conveying and return runs of a conveyor belt but oriented to rotate about axes parallel to the belt edges. The flanged rollers inhibit lateral movement of the belt when the edges of the belt contact the flanges extending downward. In Hoggan the rollers extend over the edges of the belt to prevent the edges of the belt from curling up when they contact the flanges.

Prior art flanged guiding rollers used to maintain tracking provide resistance to lateral belt movement only at discrete points along the belt edge. Providing such guide rollers is costly both in terms of initial cost and continued maintenance. Further, the top conveying run of a bulk conveyor is often enclosed in a tube, such that guide rollers cannot be conveniently provided on that portion of the belt.

Rather than forcing the belt to track properly using guide rollers, U.S. Pat. No. 2,655,251 to Bankauf discloses conveyor rollers that skew in response to lateral belt movement in order to maintain the belt in the center of the rollers.

SUMMARY OF THE INVENTION

It is an object of the present invention to provide a belt guide apparatus for maintaining proper tracking in a belt conveyor that overcomes problems in the prior art.

The present invention provides in one embodiment, a belt guide apparatus adapted for attachment to a belt conveyor comprising an endless belt with a conveying run and a return run. The apparatus comprises right and left top plates and right and left bottom plates. A right wall extends between the right top plate and the right bottom plate and a left wall extends between the left top plate and the left bottom plate. The right and left top plates, right and left bottom plates, and right and left walls form a belt envelope that defines a belt opening that substantially corresponds to a cross-section of the endless belt such that the endless belt can slide freely through the belt opening yet is substantially prevented from moving laterally or vertically. A front entrance of the belt envelope is configured to funnel the endless belt into the belt opening, and when attached to the belt conveyor the belt envelope is oriented such the right and left walls are aligned with a desired path of the endless belt, and the endless belt passes through the belt opening.

In a second embodiment the invention provides a belt conveyor comprising front and rear end rollers mounted on a frame, and an endless belt mounted on the end rollers and driven such that a top conveying run of the endless belt moves from the front roller toward the rear roller along a top of the frame, and a bottom return run of the endless belt moves from the rear roller toward the front roller along a bottom of the frame. A belt guide comprises right and left top plates; right and left bottom plates; a right wall extending between the right top plate and the right bottom plate; and a left wall extending between the left top plate and the left bottom plate. The right and left top plates, right and left bottom plates, and right and left walls form a belt envelope that defines a belt opening that substantially corresponds to a size of a cross-section of the endless belt such that the endless belt can slide freely through the belt opening yet is substantially prevented from moving laterally or vertically. A front entrance of the belt envelope is configured to funnel the endless belt into the belt opening. At least one belt guide is mounted on the frame such the right and left walls are aligned with a desired path of the bottom return run of the endless belt, and such that the bottom return run of the endless belt passes through the belt opening.

In the belt guide of the invention the belt passes through a belt envelope with an opening substantially equal in size to the cross section of the belt and aligned on the desired path of the belt, generally a path along the middle of the end and drive rollers of the belt conveyor. Thus the belt is restricted to that path while passing through the belt guide, and the belts tendency to move laterally on the rollers is reduced. One or more belt guides can be provided on a belt conveyor, depending on size, configuration, loading and like conditions.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
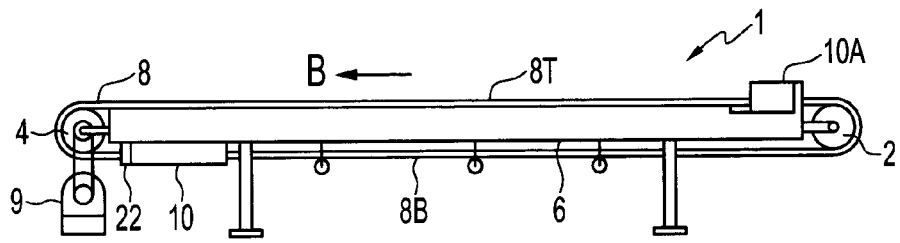
FIG. 1 is a schematic side view of a belt conveyor with a flat top conveying run and with a belt guide of the invention mounted such that the bottom return run of the belt conveyor passes through the belt guide.

FIG. 1 illustrates a belt conveyor 1 of the present invention wherein the top conveying run of the endless belt is substantially flat, typical of a belt conveyor adapted to transfer packages and like discreet articles. The belt conveyor 1 comprises front and rear end rollers 2, 4 mounted on a frame 6, and an endless belt 8 mounted on the end rollers 2, 4 and driven such that a top conveying run 8T of the endless belt 8 moves in the belt travel direction B from the front roller 2 toward the rear roller 4 along a top of the frame 6, and a bottom return run 8B of the endless belt 8 moves from the rear roller 4 toward the front roller 2 along a bottom of the frame 6. In the illustrated embodiment the endless belt 8 is driven by a motor 9 rotating the rear end roller 4. The front and rear end rollers 2, 4 are mounted on the frame 6 perpendicular to the desired path of the endless belt 8.

A belt guide 10 of the invention is mounted to the frame 6 adjacent to the rear end roller 4 such that the bottom return run 8B of the endless belt 8 passes through the belt guide 10 after passing over the rear end roller 4. A further belt guide 10A is mounted to the frame 6 adjacent to the front end roller 2 such that the top conveying run 8T of the endless belt 8 passes through the belt guide 10 after passing over the front end roller 2.

The belt guide 10 can be installed on a variety of belt conveyors, both as original equipment and on existing conveyors. Typically, in order to avoid interfering with the material being conveyed, belt guides will be mounted such that the bottom return run 8B rather than the top conveying run 8T passes through the belt guide, but if desired belt guides can also be placed in the position of belt guide 10A such that the top conveying run passes through the belt guide.

Figure 2:
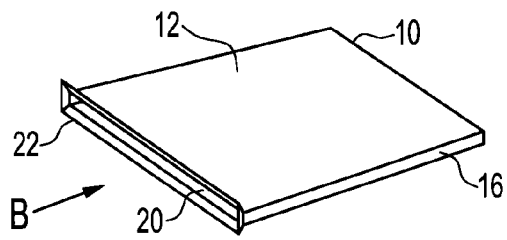
FIG. 2 is a perspective view showing the belt guide of FIG. 1.
Figure 3:
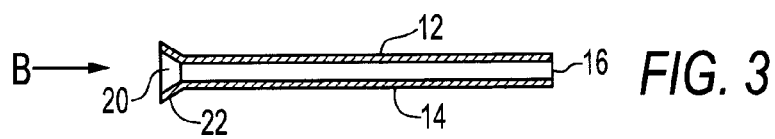
FIG. 3 is a cross-sectional side view of the belt guide of FIG. 1.
Figure 4:
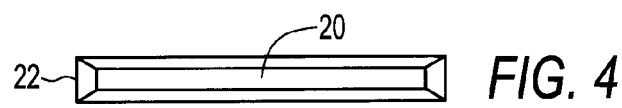
FIG. 4 is front view of the belt of FIG. 1.
Figure 5:
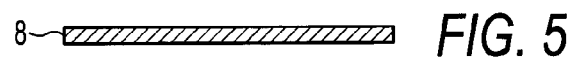
FIG. 5 is a cross-sectional view of the endless belt of the belt conveyor of FIG. 1.

As illustrated in FIGS. 2-4, the belt guide 10 comprises a top plate 12 and a bottom plate 14. A right and left walls 16 extend between the top plate 12 and the bottom plate 14 and the top plate 12, bottom plate 14, and walls 16 form a belt envelope that defines a belt opening 20 that substantially corresponds to a size of a cross-section of the endless belt 8, illustrated in FIG. 5, such that the endless belt 8 can slide freely through the belt opening 20 yet is substantially prevented from moving laterally or vertically.

The belt guide 10 is mounted on the frame 6 such that the right and left walls 16 are aligned with a desired path of the bottom return run 8B of the endless belt 8. In FIG. 1, the desired path will generally be a path centered laterally on the rear end roller 4. The belt guide 10 is placed adjacent to the rear end roller 4 with the walls thereof aligned with that path so that as the endless belt 8 comes off the rear end roller 4 its travel path is restricted to the desired path just after it comes off the rear end roller 4.

Figure 6:
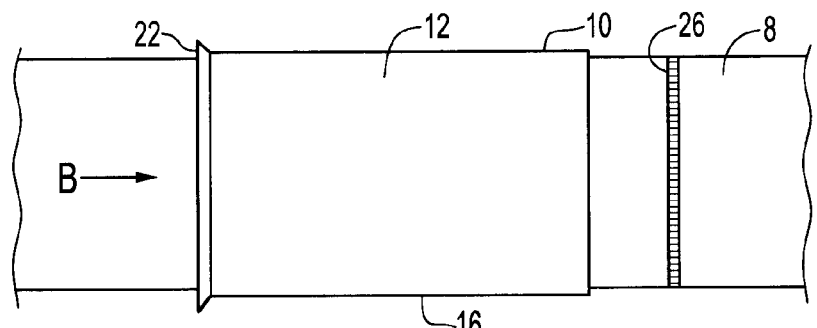
FIG. 6 is a top view of the belt guide of FIG. 1 showing the belt passing through the belt guide.

Similarly a second belt guide 10 can be placed adjacent to the front end roller 2 so that the endless belt 8 is restricted to the desired path just prior to passing over the front end roller 2. While it is contemplated that the belt guide will provide improved tracking regardless of where it is located on the bottom return run 8B of the endless belt 8, it is also contemplated that a location in proximity to one of the end or drive rollers will be preferred in practice. While the belt guide 10 of the invention can be made in varying lengths, from a short length such that the top and bottom plates 12, 14 are like bars, to a length in the order of a multiple of the width of the endless belt 8 as illustrated in FIGS. 2 and 6, it is contemplated that shorter belt guides are likely to cause more wear on the belt than longer ones.

Figure 10:
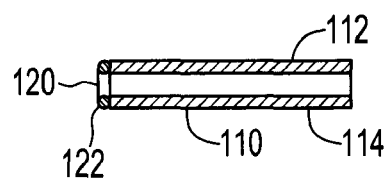
FIG. 10 is a schematic sectional side view of an alternate belt guide of the resent invention.

The front entrance 22 of the belt envelope is configured to funnel the endless belt 8 into the belt opening 20. In the embodiment illustrated in FIGS. 2-4 and 6, the front entrance 22 is formed by bending the top plate 12 upward, the bottom plate 14 downward, and the walls 16 outward. FIG. 10 illustrates an alternate embodiment wherein edges of the top and bottom plates 112, 114 at the front entrance 122 are rounded, either by welding a cylindrical rod along the edges, or by grinding or otherwise forming a rounded edge. Similarly the edges of the walls of belt guide 110 would be rounded.

Rounding or bending the edges of front entrance 22, 122 to funnel the belt into the belt opening 20, 120 reduces wear on the edges of the endless belt 8. As well, endless belts are often made by joining the ends of a conveyor belt with a belt lace 26, such as shown in FIG. 6, and such a lace could catch on sharp edges, and so same should be avoided.

Further, where a belt lace 26 is present, the cross section of the endless belt 8 at the lace may be somewhat larger than in the rest of the belt. Care must be taken that the belt opening 20 is large enough to allow the belt lace to pass through.

Figure 7:
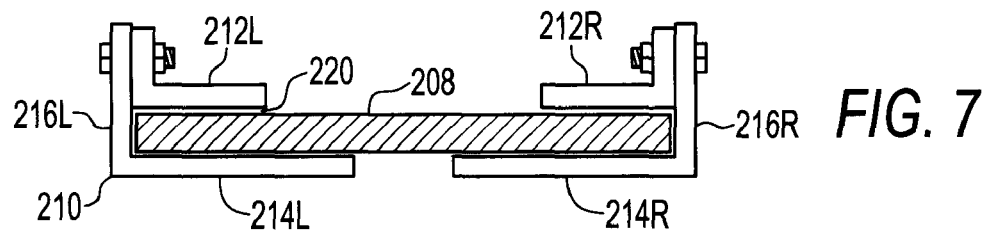
FIG. 7 is a schematic cross-sectional view of an alternate embodiment of the belt guide of the invention.

In the belt guide illustrated in FIGS. 2-4, and 6 the top and bottom plates 12, 14 extend from the right wall to the left wall, however it is contemplated that a center portion of the belt guide could be left open as in the belt guide 210 schematically illustrated in cross section in FIG. 7. The belt guide 210 comprises right and left top plates 212R, 212L and right and left bottom plates 214R, 214L. A right wall 216R extends between the right top plate 212R and the right bottom plate 214R, and a left wall 216L extends between the left top plate 212L and the left bottom plate 214L. As in the belt guide 10 of FIGS. 2-4, and 6, the plates 212R, 212L, 214R, 214L and walls 216R, 216L form a belt envelope that defines a belt opening 220 that substantially corresponds to a size of a cross-section of the endless belt 208, such that the endless belt 208 can slide freely through the belt opening 220 yet is substantially prevented from moving laterally or vertically. The plates 212R, 212L, 214R, 214L do not allow the outer portions and edges of the endless belt 208 to move vertically, and the walls 216R, 216L prevent lateral movement. While the central portion of the endless belt 208 is not vertically restricted, it is contemplated that by restricting vertical movement of the outer portions of the endless belt 208, the belt will be maintained in the desired location.

Figure 8:
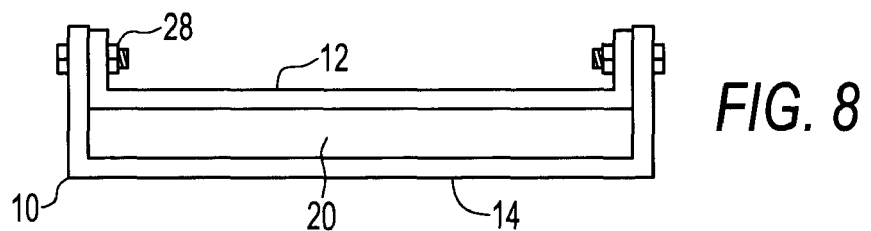
FIG. 8 is a schematic cross-sectional view of the belt guide of FIG. 1.

In the belt guide 10 of FIGS. 2-4, and 6, and as illustrated in cross section in FIG. 8, the plates 212R, 212L, 214R, 214L of FIG. 7 are simply connected to form a substantially planar top and bottom plates 12, 14 extending from the right wall to the left wall 16R, 16L. It is contemplated that it also might be desirable to provide apertures in the central portion of the top and bottom plates 12, 14 in order to allow foreign material to exit the belt guide 10.

FIG. 8 also illustrates a convenient structure for making the belt guide 10 by forming a metal plate in a U-shape to provide the bottom plate 14 and right and left walls 16R, 16L, and forming another metal plate in corresponding U-shape to provide the top plate 12 and flanges to attach, with bolts 28, screws, or like fasteners, to the portions of the walls 16R, 16L extending above the opening 20. The belt guide 10 can thus readily be installed on the endless belt 8 by positioning the two U-shaped metal plates on the top and bottom of the belt and fastening them together. Suitable mounting brackets for installing the belt guide 10 will be readily provided by those skilled in the art.

Figure 9:
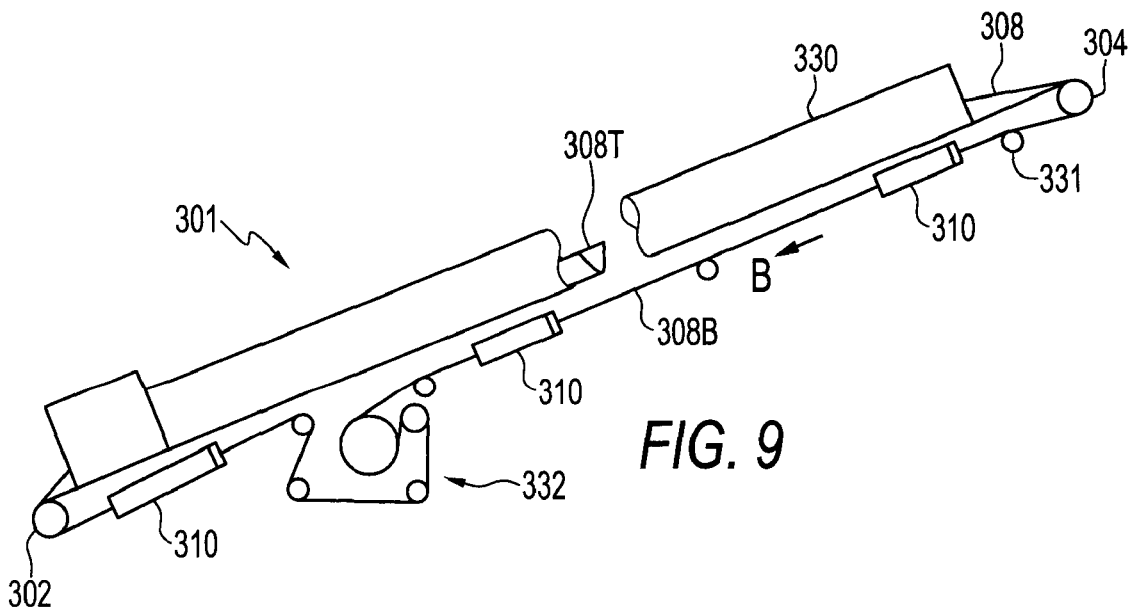
FIG. 9 is a schematic side view of a belt conveyor with a troughed top conveying run and with three belt guides of the invention mounted such that the bottom return run of the belt conveyor passes through the belt guides.

FIG. 9 illustrates a belt conveyor 301 adapted to transfer bulk material wherein the top conveying run 308T of the endless belt 308 is troughed and passes through a tube 330 that is mounted on a frame or supporting structure that, for clarity of illustration, is not shown. At the ends of the belt conveyor 301, the endless belt 308 passes over front and rear end rollers 302, 304 the endless belt 308 flattens out such that the bottom return run 308B is flat. The bottom return run 308B of the endless belt 308 of the belt conveyor 310 is supported on idler rollers 331 and passes through an S-drive 332, such as is well known in the art.

The illustrated embodiment shows a belt guide 310 mounted on the frame adjacent to the front end roller 302, rear end roller 304, and upstream from the S-drive 332. The bottom return run 8B of the endless belt 8 passes through a belt guide 310 prior to passing over the front end roller 302 and prior to passing through the S-drive 332, and just after passing over the rear end roller 304. Thus the endless belt 8 is restricted to the desired path down the middle of the rollers of the S-drive 332, and the front and rear end rollers 302, 304 at locations adjacent to those rollers. Thus maximum tracking guidance is provided by the three belt guides 310 illustrated in FIG. 8.

Typically, it is contemplated that the belt guide 310 of such a troughed conveyor will be attached such that a flat portion of the bottom return run 308B of the endless belt 308 passes therethrough. As discussed above however, belt guides can also be mounted on a flat portion of the top conveying run where desired, and where same will not interfere with material being carried on the endless belt.

Similarly, it is contemplated that a belt guide could be positioned such that a troughed portion of the top conveying run of endless belt passed therethrough, provided that the belt opening was formed into the desired troughed path of the endless belt. It is contemplated however that the expense of forming the belt guide to provide the properly shaped belt opening, and the limited locations for placing the belt guide where it will not interfere with material being conveyed, will make it impractical and undesirable, as well as unnecessary, to position the belt guide so that a troughed portion of the endless belt passes therethrough.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A belt guide apparatus adapted for attachment to a belt conveyor comprising an endless belt with a conveying run and a return run, the apparatus comprising:

right and left flat top plates;

right and left flat bottom plates oriented substantially parallel to the right and left flat top plates and oriented such that the right top and bottom plates are located in substantially the same plane, and such that the left top and bottom plates are located in substantially the same plane;

a right wall extending between the right top plate and the right bottom plate; and a left wall extending between the left top plate and the left bottom plate;

wherein the right and left top plates, right and left bottom plates, and right and left walls form a belt envelope that defines a belt opening that substantially corresponds to a cross-section of the endless belt such that the endless belt can slide freely through the belt opening;

wherein a front entrance of the belt envelope is configured to funnel the return run of the endless belt into the belt opening in a flat orientation;

wherein the belt envelope, when attached to the belt conveyor, is configured and oriented such that the belt opening is aligned with a desired flat path of the return run of the endless belt, and the walls are in proximity to edges of the return run of the endless belt to prevent the return run of the endless belt from moving laterally and the right and left top and bottom plates are in proximity to corresponding right and left upper and lower surfaces of the return run of the endless belt to prevent at least outer portions of the return run of the endless belt from moving vertically while passing through the belt opening, and wherein the conveying run is located above the top plates of the belt envelope.

2. The apparatus of claim 1 wherein the right and left top plates are connected to form a top plate extending from the right wall to the left wall.

3. The apparatus of claim 1 wherein the right and left bottom plates are connected to form a bottom plate extending from the right wall to the left wall.

4. The apparatus of claim 1 wherein ends of a belt are connected by a belt lace to form the endless belt.

5. The apparatus of claim 1 wherein the belt conveyor is adapted to transfer packages and wherein the conveying run of the endless belt is substantially flat.

6. The apparatus of claim 1 wherein the belt conveyor is adapted to transfer bulk material and wherein the conveying run of the endless belt is troughed.

7. The apparatus of claim 6 wherein the conveying run of the endless belt passes through a tube.

8. The apparatus of claim 1 adapted for attachment to the belt conveyor adjacent to an end roller of the belt conveyor.

9. The apparatus of claim 1 wherein the belt conveyor comprises an S-drive, and wherein the apparatus is adapted for attachment to the belt conveyor adjacent to the S-drive such that the return run of the endless belt passes through the belt envelope prior to passing through the S-drive.

10. A belt conveyor apparatus comprising:
    front and rear end rollers mounted on a frame, and an endless belt mounted on the end rollers and driven such that a top conveying run of the endless belt moves from the front roller toward the rear roller along a top of the frame, and a bottom return run of the endless belt moves from the rear roller toward the front roller along a bottom of the frame;
    at least one belt guide comprising:
      right and left flat top plates;
      right and left flat bottom plates oriented substantially parallel to the right and left flat top plates and oriented such that the right top and bottom plates are located in substantially the same plane, and such that the left top and bottom plates are located in substantially the same plane;
      a right wall extending between the right top plate and the right bottom plate; and
      a left wall extending between the left top plate and the left bottom plate;
      wherein the right and left top plates, right and left bottom plates, and right and left walls form a belt envelope that defines a belt opening that substantially corresponds to a cross-section of the endless belt such that the endless belt can slide freely through the belt opening yet is substantially prevented from moving laterally or vertically; and
      wherein a front entrance of the belt envelope is configured to funnel the bottom return run of the endless belt into the belt opening;
    wherein the at least one belt guide is mounted on the frame such the right and left walls are aligned with a desired path of the bottom return run of the endless belt, and such that the bottom return run of the endless belt passes through the belt opening, and such that the conveying run of the endless belt is located above the top plates of the belt guide.

11. The belt conveyor of claim 10 wherein the right and left top plates are connected to form a substantially planar top plate extending from the right wall to the left wall.

12. The apparatus of claim 10 wherein the right and left bottom plates are connected to form a substantially planar bottom plate extending from the right wall to the left wall.

13. The apparatus of claim 10 wherein the belt conveyor is adapted to transfer packages and wherein the top conveying run of the endless belt is substantially flat.

14. The apparatus of claim 10 wherein the belt conveyor is adapted to transfer bulk material and wherein the top conveying run of the endless belt is troughed.

15. The belt conveyor of claim 14 wherein the top conveying run of the endless belt passes through a tube.

16. The apparatus of claim 10 comprising a belt guide mounted to the frame adjacent to the front end roller such that the bottom return run of the endless belt passes through the belt opening prior to passing over the front end roller.

17. The apparatus of claim 10 comprising a belt guide mounted to the frame adjacent to the rear end roller such that the bottom return run of the endless belt passes through the belt opening after passing over the rear end roller.

18. The apparatus of claim 10 comprising an S-drive, and a belt guide mounted to the frame adjacent to the S-drive such that the bottom return run of the endless belt passes through the belt opening prior to passing through the S-drive.

\* \* \* \* \*